United States Patent

[11] 3,632,893

[72] Inventors Fred C. Bolick, Jr.; James B. Godwin, III, both of Atlanta, Ga.

[21] Appl. No. 854,428
[22] Filed Sept. 2, 1969
[45] Patented Jan. 4, 1972
[73] Assignee Lanier Electronic Laboratory, Inc. Atlanta, Ga.

[54] CONTROL DEVICE FOR A TRANSCRIBING MACHINE WITH AUTOMATIC RECALL
9 Claims, 3 Drawing Figs.

[52] U.S. Cl. .......... 179/100.1 R, 179/100.1 DR
[51] Int. Cl. .......... G11b 15/20
[50] Field of Search .......... 179/100.1 R, 100.1 DR, 100.1 C, 100.2 R, 100.2 S, 100.1 VC, 100.2 B, 100.2 MD

[56] References Cited

UNITED STATES PATENTS

| | | | |
|---|---|---|---|
| 3,567,229 | 3/1971 | Ridings et al. | 274/1 |
| 2,336,777 | 12/1943 | Clemsen | 179/100.2 S |
| 2,553,410 | 5/1951 | Handschin | 179/100.1 VC |
| 3,011,030 | 11/1961 | Langendorf | 179/100.1 VC |
| 3,045,884 | 7/1962 | Buhendorf | 179/100.2 R |
| 3,136,465 | 6/1964 | Comstock | 179/100.2 R |

*Primary Examiner*—Bernard Konick
*Assistant Examiner*—Raymond F. Cardillo, Jr.
*Attorney*—Jones & Thomas

ABSTRACT: A control device for controlling the motion of a tape in a transcribing machine so that successive transcribing intervals are overlapped by a predetermined amount to facilitate transcribing. A circuit is provided for causing the tape to move in a transcribing reverse direction when a transistor is made conductive by another transistor becoming conductive in response to a capacitor charging current which occurs when the tape stops moving in a transcribing direction. The amount of overlap of successive transcribing intervals is proportional to the duration of the capacitor charging current.

INVENTORS
Fred C. Bolick, Jr.
James B. Godwin, III

BY Jones & Thomas
ATTORNEYS

CONTROL DEVICE FOR A TRANSCRIBING MACHINE WITH AUTOMATIC RECALL

BACKGROUND OF THE INVENTION

1. Field of the Invention

This invention relates to control devices and more particularly, to a control device for controlling the motion of a tape or other recording medium in a recording-transcribing machine in such a manner that a predetermined motion of the tape is automatically achieved.

2. Description of the Prior Art

In using a recording-transcribing machine such as a recording-transcribing machine by which information is recorded on a tape or other recording medium and subsequently transcribed, the transcribing function is generally accomplished by periodically advancing the tape to provide a series of transcribing intervals separated by catchup intervals. The reason for this is that even the best transcriber occasionally falls behind in the transcribing of the information recorded on a tape if the tape is continuously advanced.

The transcribing and catchup intervals required during a transcribing function vary in their durations and in their number with the skill of the transcriber and with the difficulty of the information being transcribed. However, regardless of the durations of the transcribing and catchup intervals and the number of transcribing and catchup intervals required by a particular transcriber to transcribe particular information, it is generally desirable and frequently necessary to provide an overlap of successive transcribing intervals in the sense that the beginning of a transcribing interval includes that information which was at the end of the previous transcribing interval. Such an overlap of successive transcribing intervals provides a continuity to the transcribing function that enables the transcriber to accurately relate new information to be transcribed to that information transcribed during the previous transcribing interval.

In the prior art, this overlap of successive transcribing intervals has been provided by a control device for a recording-transcribing machine. Such a prior art control device has two control switches which are alternately operated by a transcriber. One of these control switches is the tape advance switch which causes a transcribing motion of the tape when it is operated and the other of these control switches is the tape reverse switch which causes a transcribing reverse motion of the tape that is opposite to the transcribing motion when it is operated. With such a prior art control device, the transcribing of information from a tape in a recording-transcribing machine using successive transcribing intervals which overlap can be accomplished only by the transcriber operating the tape reverse switch at the end of each catchup interval and prior to operating the tape advance switch to start a transcribing interval.

This operation of two control switches in a prior art control device to achieve overlapping successive transcribing intervals is annoying to a transcriber. Moreover, the resulting transcribing function is inefficient because the amount of overlap of successive transcribing intervals is always directly proportional to the duration of the operation of the tape reverse switch by a transcriber and because the operation of the tape reverse switch must either interfere with the efficiency of the transcriber by diverting the attention of the transcriber from the information being transcribed or be random so that the amount of overlap is sometimes too long and sometimes too short to provide for an efficient transcribing function.

Further, even a skilled transcriber frequently forgets to operate the tape reverse switch prior to operating the tape advance switch even though an overlap of successive transcribing intervals is desired. The result is that there is a false start of a transcribing interval which must be immediately followed by the operation of the tape reverse switch and by the second operation of the tape advance switch in order to provide an overlap of transcribing intervals. Such a false start of a transcribing interval is particularly annoying to a transcriber and very inefficient.

SUMMARY OF THE INVENTION

The invention disclosed herein overcomes these and other problems encountered with a prior art control device used to control tape motion in a dictating-transcribing machine. This is because the invention provides a control device by which an overlap of successive transcribing intervals is achieved even though the transcriber operates only a tape advance switch. Moreover, the invention provides a control device by which the amount of overlap of successive transcribing intervals is fixed at any one of a plurality of predetermined amounts of overlap, including no overlap, depending upon the skill of the transcriber and the difficulty of the information being transcribed.

Further, the invention provides a control device by which the amount of overlap of successive transcribing intervals may still be controlled by a transcriber independently of any predetermined amount of overlap provided by the control device. In addition, the invention provides a control device which is inoperative to cause either transcribing motion or transcribing reverse motion of a tape in a recording-transcribing machine when the control device is not in use even though the recording-transcribing machine is still operative in response to other control devices and even though the control device is responsive to a work available signal from the recording-transcribing machine. This last feature serves to prevent the unintentional operation of a recording-transcribing machine by the control device while at the same time providing a transcriber at the control device with an indication that there is information on a tape in the recording-transcribing machine that requires transcribing.

These improvements in a control device are provided by a control device having a tape advance switch, a tape reverse switch, and a tape-reversing means independent of the tape reverse switch and responsive to the tape advance switch for causing a predetermined but variable amount of transcribing reverse motion of the tape during the catchup interval subsequent to each transcribing interval. In addition, the control device includes an indicating means responsive to a work available signal from the recording-transcribing machine and a master switch which serves to isolate the control device from the recording-transcribing machine and prevent the unintentional operation of the recording-transcribing machine by the control device while at the same time not interfering with the operation of the recording-transcribing device from another control device or with the response of the indicating means to a work available signal from the recording-transcribing machine.

DESCRIPTION OF THE DRAWING

These and other features and advantages of the invention will be more clearly understood upon consideration of the following specification and the accompanying drawing is which.

DESCRIPTION OF THE PREFERRED EMBODIMENT

Figure 1:
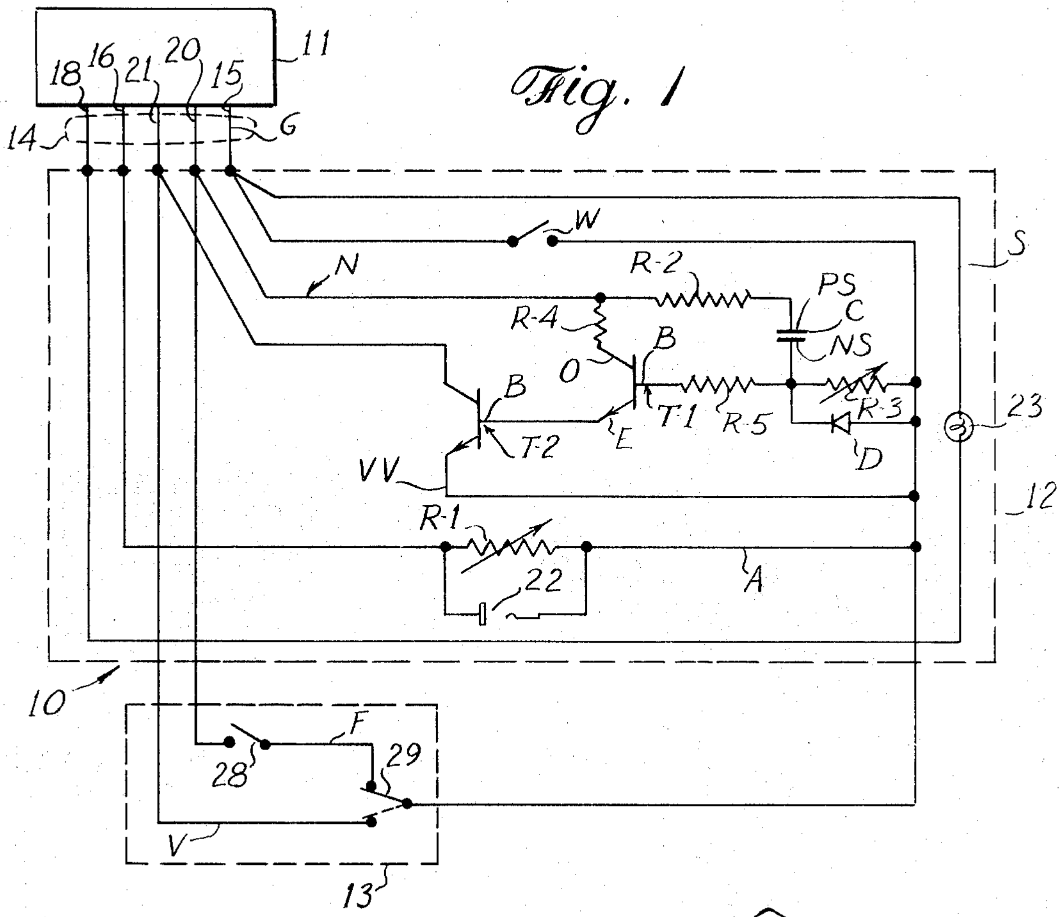
FIG. 1 is a schematic diagram of an embodiment of the invention disclosed herein.
Figure 2:
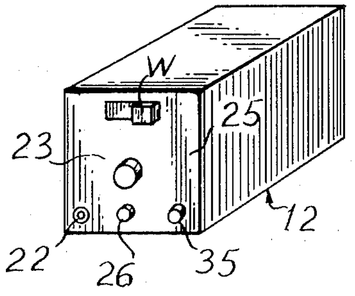
FIG. 2 is a perspective view of a listening unit in an embodiment of the invention.
Figure 3:
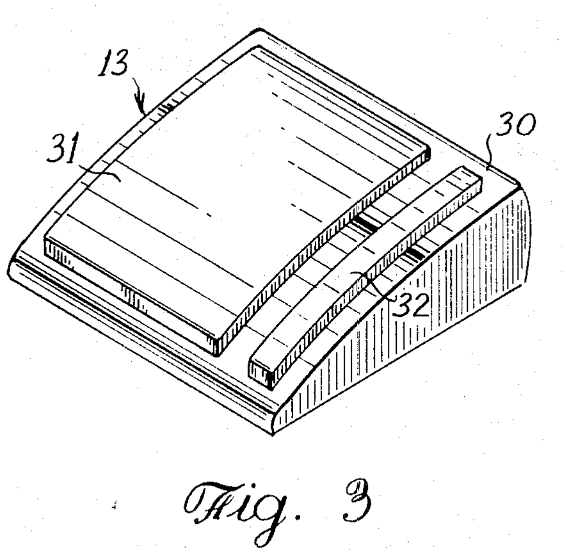
FIG. 3 is a perspective view of an operating unit in an embodiment of the invention.

The drawing and the following detailed description disclose a specific embodiment of the invention for controlling the motion of a tape in a recording-transcribing machine in such a manner that a predetermined motion of the tape is automatically achieved during the catchup interval between transcribing intervals. However, it is to be understood that the invention may be embodied in other equivalent forms such as in a control device for controlling the motion of a tape or other recording medium in a recording-transcribing machine in such a manner that a predetermined motion of the tape in a recording reverse direction is automatically achieved between recording intervals.

That embodiment of the invention disclosed herein which is for controlling the motion of a tape (not shown) during the transcribing function of a recording-transcribing machine 11 may be most easily understood as a control device 10 which includes a listening unit 12 and an operating unit 13. The recording-transcribing machine 11 is shown only as a block because it may be substantially any conventional recording-transcribing machine in which motion of a tape or other recording medium (not shown) relative to a transcribing head (not shown) is controlled by the completion of one or more circuits at the control device 10 and which provides an audio output and a work available signal to the control device 10 over circuits that are completed at the control device 10.

In that embodiment of the invention disclosed herein, the recording-transcribing machine 11 is operatively connected to the control device 10 with a five-wire cable 14 and an audio output is provided from the recording-transcribing machine 11 to the control device 10 by wires 15 and 16 in the cable 14 and by an audio loop A in the control device 10 between the wires 15 and 16. Thus, the wires 15 and 16 and the audio loop A serve as an audio means for providing an audio signal at a jack 22 in response to information on a tape.

A work available signal is provided from the recording-transcribing machine 11 to the control device 10 by wires 15 and 18 in the cable 14 and by a signal loop S in the control device 10 between the wires 15 and 18. Any convenient means (not shown) may be used in the recording-transcribing machine 11 to provide a work available signal to the wires 15 and 18 at the recording-transcribing machine 11 when there is information on a tape in the recording-transcribing machine 11 that requires transcribing.

Transcribing motion of a tape in the recording-transcribing machine 11 is controlled from the control device 10 by wires 15 and 20 in the cable 14 and by a forward control loop F in the control device 10 between the wires 15 and 20. Transcribing reverse motion of a tape in the recording-transcribing machine 11 is controlled from the control device 10 by wires 15 and 21 in the cable 14 and by a first reverse control loop V and a second reverse control loop VV in parallel with each other in the control device 10 between the wires 15 and 21.

In addition to the loops A, S, F, V, and VV, the control device 10 includes a conditioning loop N which is in parallel with the forward control loop F in the control device 10 between the wires 15 and 20. The loops A, S, F, V, VV, and N are described in more detail below, but it will be understood at this point that it is by the loops A, S, F, V, VV, and N that the control device 10 controls or is responsive to a recording-transcribing machine 11.

The audio loop A includes the jack 22 in parallel with a variable resistor R-1 and in series with a master switch W. The signal loop S includes a lamp 23 so that the wires 15 and 18 and the signal loop S provide an indicating means for indicating when there is information on a tape that requires transcribing. The jack 22, the master switch W, the variable resistor R-1 and the lamp 23 are positioned in the listening unit 12 of the control device 10.

The listening unit 12 is conveniently a boxlike structure having a panel 25 in which the jack 22, the master switch W, and the lamp 23 are mounted. In addition, a knob 26 for varying the resistance of the variable resistor R-1 is also conveniently mounted in the panel 25 and those skilled in the art will understand that varying the resistance of the variable resistor R-1 changes the amplitude of the audio signal heard when the plug of a conventional headset (not shown) is inserted into the jack 22. Moreover, those skilled in the art will understand that the listening unit 12 is conveniently placed upon a surface adjacent to a person serving as a transcriber.

The forward control loop F and the wires 15 and 20 serve as a first control means for causing a tape to move in a first direction and the forward control loop F includes a tape advance switch 28, a tape reverse switch 29 in its first position as shown in solid line in FIG. 1, and the master switch W in series with each other between the wires 15 and 20. The first reverse control loop V and the wires 15 and 21 serve as a second control means for causing a tape to move in a second direction opposite to its first direction and the first reverse control loop V includes the tape reverse switch 29 in its second position as shown in dashed line in FIG. 1 and the master switch W in series with each other between the wires 15 and 21.

The tape advance switch 28 and the tape reverse switch 29 are in the operating unit 13 of the control device 10 and those skilled in the art will understand that the operating unit 13 is conveniently a housing 30 in which a plurality of foot pedals 31 and 32 are pivotally mounted so that the pressing of the foot pedal 31 closes the tape advance switch 28 and the pressing of the foot pedal 32 moves the tape reverse switch 29 from its first position to its second position as shown by dashed line in FIG. 1.

The conditioning loop N includes a fixed resistor R-2, a capacitor C, a variable resistor R-3, and the master switch W in series with each other between the wires 15 and 20. In addition, the conditioning loop N includes the collector-base circuit of an NPN transistor T-1 in parallel with the resistor R-2 and the capacitor C. Further, the conditioning loop N includes a diode D in parallel with the resistor R-3 and current-limiting resistors R-4 and R-5 in series with the collector 0 and the base B respectively of the transistor T-1.

The wire 15 is conveniently at ground G and the wire 20 is conveniently placed at some positive voltage such as a positive 24 volts by the recording-transcribing machine 11. As a result, one side of the capacitor C may be regarded as a positive side PS and the other side of the capacitor C may be regarded as a negative side NS. The resistance of the resistor R-3 in series with the capacitor C is varied by turning a knob 35 mounted in the panel 25 of the listening unit 12.

The second reverse control loop VV includes the emitter-collector circuit of an NPN transistor T-2 and the master switch W in series with each other between the wires 15 and 21. The base B of the transistor T-2 is connected to the emitter E of the transistor T-1.

OPERATION

The invention will be further understood when the operation of that embodiment of the invention disclosed herein is explained. The operation of that embodiment of the invention disclosed herein can be best explained by considering conditions in the control device 10 during a transcribing interval. A transcribing interval is initiated by the closing of the tape advance switch 28 in the forward control loop F with the foot pedal 31 while the master switch W is in its operative position and the tape reverse switch 29 is in its first position as shown by solid line in FIG. 1. During a transcribing interval, a tape in the recording-transcribing machine 11 will move with a transcribing motion relative to a transcribing head and the audio signal will be available at the jack 22 in the audio loop A for the transcribing of the information on the tape by a transcriber.

The transcribing interval will normally continue as long as the tape advance switch 28 is maintained in its operative position by the pressing of the foot pedal 31. However, if the tape reverse switch 29 is inadvertently moved from its first position to its second position as shown by dashed line in FIG. 1, the forward control loop F is opened to prevent the control device 10 from simultaneously causing motion of a tape in the recording-transcribing machine 11 in opposite directions. Similarly, if the master switch W is placed in open or inoperative position, the forward control loop F is opened regardless of the position of the tape advance switch 28.

While the forward control loop F is closed during a transcribing interval, the potential applied to the negative side NS of the capacitor C through the resistor R-3 is the potential of the wire 15 which is most conveniently ground G. This is also the potential of the positive side PS of the capacitor C to which the wire 15 is also connected through the forward control loop F and the resistor R-2. As a result, there is no potential difference across the capacitor C or across the transistor T-1 in the collector-base circuit which is in parallel with the capacitor C. However, the potential applied to the collector O of the transistor T-2 is that provided by the recording-transcribing machine 11 on the wire 21 which is conveniently 24 volts positive and the potential applied to the emitter E of the transistor T-2 is that of wire 15 or ground G.

As a result, there is a potential difference across the transistor T-2 in the emitter-collector circuit. In spite of this potential difference across the transistor T-2, the transistor T-2 does not conduct because the potential applied to its base B by the emitter E of the transistor T-1 is that of wire 15 or ground G. Thus, when the forward control loop F is closed, the transistor T-2 provides a substantially infinite impedance in the second reverse control loop VV.

When a transcriber or other person using the control device 10 has fallen behind in the transcribing of information from a tape in the recording-transcribing machine 11, the transcribing interval is terminated by the release of the foot pedal 31 and the tape advance switch 28 being placed in its inoperative position. Upon the tape advance switch 31 being placed in its inoperative position, the forward control loop F is opened and potential applied to the positive side PS of the capacitor C through the resistor R-2 becomes the potential of wire 20 which is 24 volts positive. However, the potential applied to the negative side NS of the capacitor C through to resistor R-3 remains that of wire 15 or ground G. As a result, there is an initail flow of charging current in the conditioning loop N through the resistor R-2, the capacitor C and the resistor R-3. The diode D is positioned to prevent the substantial flow of any current through the diode D under this potential condition.

The impedance of the capacitor C is relatively small and those skilled in the art will understand that with an initial flow of charging current in the conditioning loop N, the resistor R-2 and the resistor R-3 provide a voltage dividing circuit in which the potential applied to the base B of the transistor T-1 is a positive potential which is dependent upon the resistance of the resistor R-3. This positive potential makes the base B of the transistor T-1 positive relative to the emitter E of the transistor T-1 which through the transistor T-2 is at the potential of the wire 15 or ground G.

As a result, the transistor T-1 becomes conductive and remains conductive substantially until the capacitor C is charged and there is no longer any flow of charging current through the resistors R-2 and R-3. When there is no flow of charging current through the resistors R-2 and R-3, the potential of the base B of the transistor T-1 becomes that of the wire 15 or ground G so that the base B of the transistor T-1 is no longer positive relative to the emitter E of the transistor T-1. The transistor T-1 is selected in conventional manner so that it will normally become nonconductive just before the potential of the base B of the transistor T-1 becomes that of the wire 15.

As described above, there is a potential across the transistor T-2 in the emitter-collector circuit and the result of the transistor T-1 becoming conductive is that the transistor T-2 also becomes conductive. This is because the emitter E of the transistor T-1 and the base B of the transistor T-2 are both positive relative to the emitter E of the transistor T-2 while the transistor T-1 is conductive.

When the transistor T-2 becomes conductive, the second reverse control loop VV is completed and the wire 15 is connected to the wire 21 in the same manner as when the tape reverse switch 29 is placed in its second position to complete the first reverse control loop V. Thus, the second reverse control loop VV and the wires 15 and 21 serve as a reverse control means for changing an electrical condition at a recording-transcribing machine 11. Further, the conditioning loop N and the wires 15 and 20 serve as a conditioning means for providing an output potential to which the reverse control means is responsive. The conditioning means and reverse control means together serve as a third motion means which in the control device 10 is a tape reversing means for causing a transcribing reverse motion of a tape.

It will be understood that this transcribing reverse motion of a tape in a recording-transcribing machine 10 is provided by the second reverse control loop VV in the control device 10 whenever a transcribing interval is terminated with the resistor R-3 having a resistance sufficient for a positive potential to be applied to the base B of the transistor T-1. However, the duration of this transcribing reverse motion of a tape and the amount of the resulting overlap of successive transcribing intervals is dependent upon the resistance of the resistor R-3 as changed by turning the knob 35.

The transcribing reverse motion of a tape is of zero duration when the resistance of the resistor R-3 is zero because the potential of the negative side NS of the capacitor C remains that of wire 15 or ground G even when there is a flow of charging current in the conditioning loop N following the tape advance switch 28 being opened without a full charge on the capacitor C. The transcribing reverse motion of a tape increases in duration from zero to its maximum amount as the resistance of the resistor R-3 is increased to its maximum value from that minimum value at which it is sufficient to make the base B of the transistor T-1 positive upon the initial flow of a charging current in the control loop N.

Those skilled in the art will understand that this increase in the duration of the transcribing reverse motion of a tape is because the charging time of a particular capacitor C and the interval of time that the negative side NS of the capacitor C is at a positive potential will vary in proportion with the resistance of the resistor R-3. Moreover, those skilled in the art will now understand that the transistors T-1 and T-2 serve as a switching means in the loops N and VV respectively and are conductive only when the resistance of the resistor R-3 is sufficient and only so long as the capacitor C is being charged by a sufficient flow of charging current.

If, during the charging of the capacitor C by a flow of charging current, the tape advance switch 28 is closed, the potential applied to the positive side PS of the capacitor C immediately changes from that of the wire 20 to that of the wire 15 or ground G because of the completing of the forward control loop F. The result is that the flow of charging current in the conditioning loop N stops and the potential of the negative side NS of the capacitor C becomes that of the wire 15 or ground G. When the potential of the negative side NS of the capacitor C becomes that of the wire 15, the transistor T-1 and the transistor T-2 both become nonconductive.

It will now be understood that although a transcribing reverse condition is provided to the second reverse control loop VV by the conditioning loop N as the capacitor C is being charged in series with the resistor R-3, this transcribing reverse condition is not only terminated at the end of an interval determined by the resistance of the resistor R-3 but it is also terminated whenever the tape advance switch 28 is placed in its operative position. Thus, although the control device 10 will provide a transcribing-reverse motion to a tape during the catchup interval subsequent to each transcribing interval, the transcribing-reverse motion of the tape may be of any duration from zero to a maximum depending upon the resistance of the resistor R-3 and may be terminated at any time simply by operation of the tape advance switch 28.

Further, the operation of the tape reverse switch 29 to complete the first reverse control loop V overrides any control of transcribing reverse motion of a tape by the second reverse control loop VV. This is because the transistor T-2 cannot conduct when the tape reverse switch 29 is in its second position as shown by dashed line in FIG. 1 since the potential of the wire 15 is applied to both the emitter E and collector O of the transistor T-2. Thus, even though the transistor T-1 is conductive, the transistor T-2 cannot be conductive when the tape reverse switch 29 is in its second position as shown by dashed line in FIG. 1.

Although the control switches 28 and 29 will control the motion of a tape in a recording-transcribing machine 11 independently of the tape-reversing means provided by the second reverse control loop VV and the conditioning loop N, the capacitor C usually is charged or at least starts to charge whenever the forward control loop F is opened by the tape advance switch 28 being placed in its inoperative position or by the tape reverse switch 29 being moved from its first position as shown in solid line in FIG. 1. However, it will be understood that whenever the tape advance switch 28 is placed in its operative position to initiate a transcribing interval, the capacitor C is immediately and rapidly discharged through the forward control loop F and the diode D so that it may be recharged upon a subsequent opening of the forward control loop F to provide a predetermined amount of transcribing reverse motion to a tape. Further, it will be understood that the charging of the capacitor C can be avoided by opening the master switch W simultaneously with opening the forward control loop F.

The master switch W serves as a switching means for preventing the audio loop A, forward control loop F, the reverse control loops V and VV, and the conditioning loop N from being completed in any manner by the control device 10 and not only prevents the capacitor C from being charged but also insures that the dictating-transcribing machine 11 is not inadvertently operated by the control device 10. However, it should be noted that the master switch W does not open the signal loop S and as a result, although the master switch W renders the control device 10 inoperative to control a recording-transcribing machine 11, the master switch W still permits an indication at the control device 10 that there is information on a tape at the recording-transcribing machine 11 to be transcribed.

From the embodiment of the invention and its operation described above, it will now be understood that the invention disclosed herein is a control device 10 for a recording-transcribing machine 11 which includes a tape-reversing means in addition to a tape advance switch 28 and a tape reverse switch 29 which cannot be operated simultaneously. It will also be understood that in that embodiment of the invention disclosed, the tape-reversing means includes the second reverse control loop VV and the conditioning loop N and that together the loops VV and N provide a transcribing reverse motion to a tape in a recording-transcribing machine 11 which may be for any one of a plurality of predetermined but selectively variable intervals of time and which is in response to the opening of the tape advance switch 28 at the termination of a transcribing interval.

Further, it will be understood that although the duration of the transcribing reverse motion of a tape provided by the tape-reversing means may be any one of a plurality of predetermined durations depending upon the skill of the transcriber and the difficulty of the information being transcribed, the transcribing reverse motion can be terminated at any time by the operation of the tape advance switch 28, the tape reverse switch 29, or the master switch W. In addition, it will be understood that the transcribing reverse motion of a tape provided by the tape reversing means may be completely eliminated so that the control device 10 controls a recording-transcribing machine 11 in substantially conventional manner simply by operation of the tape advance switch 28 and the tape reverse switch 29. Finally, it will also be understood that the master switch W renders the control device 10 inoperative to control a recording-transcribing machine 11 while permitting a recording-transcribing machine 11 to remain operative for control from other control devices 10 and while providing a signal at the control device 10 in response to a work available signal from a recording-transcribing machine 11.

We claim:

1. In a control device for controlling the motion of a tape in a transcribing machine, a first control means operative to cause a tape to move in a first direction in a transcribing machine, a second control means operative to cause said tape to move in a second direction opposite to said first direction, and a third control means operative independently of said second control means to cause said tape to move in said second direction, said third control means including a first switching means for providing an output potential in response to the charging of a capacitor by a charging current when said first control means becomes inoperative, and a second switching means responsive to said output potential for causing said tape to move in said second direction.

2. The control device of claim 1 in which said second control means renders said first control means inoperative when said second control means is operative.

3. The control device of claim 1 in which the duration of said output potential is selectively variable.

4. The control device of claim 1 in which said third control means is operative for a predetermined interval of time.

5. The control device of claim 4 in which said predetermined interval of time is selectively variable.

6. The control device of claim 1 including audio means for providing an audio signal from said transcribing machine at a jack.

7. The control device of claim 6 including indicating means for indicating the presence of an electrical condition in said transcribing machine.

8. The control device of claim 7 including switch means operative to render said first control means, said second control means, said third control means, and said audio means inoperative.

9. The control device of claim 8 in which said indicating means remains operative when said switch means is operative.

* * * * *